United States Patent
Kraus et al.

(10) Patent No.: US 8,156,604 B2
(45) Date of Patent: Apr. 17, 2012

(54) WINDSCREEN WIPING DEVICE, PARTICULARLY FOR A MOTOR VEHICLE

(75) Inventors: Achim Kraus, Buehl (DE); Joachim Zimmer, Sasbach (DE); Juergen Rapp, Lauf (DE); Hans Wickermann, Buehl (DE); Claus Fleischer, Buehl (DE); Marc-Oliver Karle, Stuttgart (DE); Christian Reiser, Ettlingen (DE); Heiko Volz, Achern (DE); Martin Joerger, Offenburg (DE); Swen Koehn, Buehl-Vimbuch (DE)

(73) Assignee: Robert Bosch GmbH, Stuttgart (DE)

( * ) Notice: Subject to any disclaimer, the term of this patent is extended or adjusted under 35 U.S.C. 154(b) by 984 days.

(21) Appl. No.: 10/588,427

(22) PCT Filed: Dec. 14, 2004

(86) PCT No.: PCT/EP2004/053439
§ 371 (c)(1), (2), (4) Date: Sep. 25, 2008

(87) PCT Pub. No.: WO2005/075265
PCT Pub. Date: Aug. 18, 2005

(65) Prior Publication Data
US 2009/0049637 A1      Feb. 26, 2009

(30) Foreign Application Priority Data
Feb. 6, 2004   (DE) .................. 10 2004 006 016

(51) Int. Cl.
*B60S 1/18* (2006.01)
*B60S 1/06* (2006.01)
*B60S 1/16* (2006.01)

(52) U.S. Cl. ............ 15/250.31; 15/250.3; 384/903; 384/295; 403/DIG. 3; 29/428; 29/445; 29/505; 29/510

(58) Field of Classification Search ............ 15/250.3, 15/250.31, 250.001, 250.34; 384/903, 226, 384/275, 276, 415, 295, 296, 624; 403/DIG. 3, 403/2; 29/428, 445, 505, 510
See application file for complete search history.

(56) References Cited

U.S. PATENT DOCUMENTS

| | | | | |
|---|---|---|---|---|
| 3,790,985 A | * | 2/1974 | Kessler | 15/250.34 |
| 5,125,755 A | * | 6/1992 | Adler et al. | 384/536 |
| 5,211,485 A | * | 5/1993 | Hoshino | 384/296 |
| 6,027,157 A | * | 2/2000 | Epple | 296/96.15 |
| 6,378,160 B1 | | 4/2002 | Kakuta et al. | |
| 6,842,939 B1 | * | 1/2005 | Hasegawa et al. | 15/250.31 |

FOREIGN PATENT DOCUMENTS

| | | | |
|---|---|---|---|
| DE | 195 46 906 | | 6/1997 |
| DE | 195 46 909 | | 6/1997 |
| DE | 198 51 816 | | 5/1999 |
| FR | 2749243 | * | 12/1997 |
| JP | 11301420 | | 11/1999 |
| JP | 2001-294127 | | 10/2001 |

\* cited by examiner

*Primary Examiner* — Gary Graham
(74) *Attorney, Agent, or Firm* — Michael Best & Friedrich LLP

(57) ABSTRACT

A windshield wiper device (10), particularly for a motor vehicle, is proposed. This windshield wiper device comprises a wiper bearing (14) supporting a wiper shaft (16), which has an undercut (48) in which a securing device (40) for axially fixing the wiper shaft (16) in the wiper bearing (14) is arranged. The securing device (40) can be displaced by the effects of a defined axial force component (F) on the wiper shaft (16), whereby the wiper shaft (16) can be displaced in relationship to the wiper bearing (14). According to the invention, the securing device (40) comprises a bushing section (42) with an indentation (50), which engages in the undercut (48) of the wiper shaft (16).

20 Claims, 2 Drawing Sheets

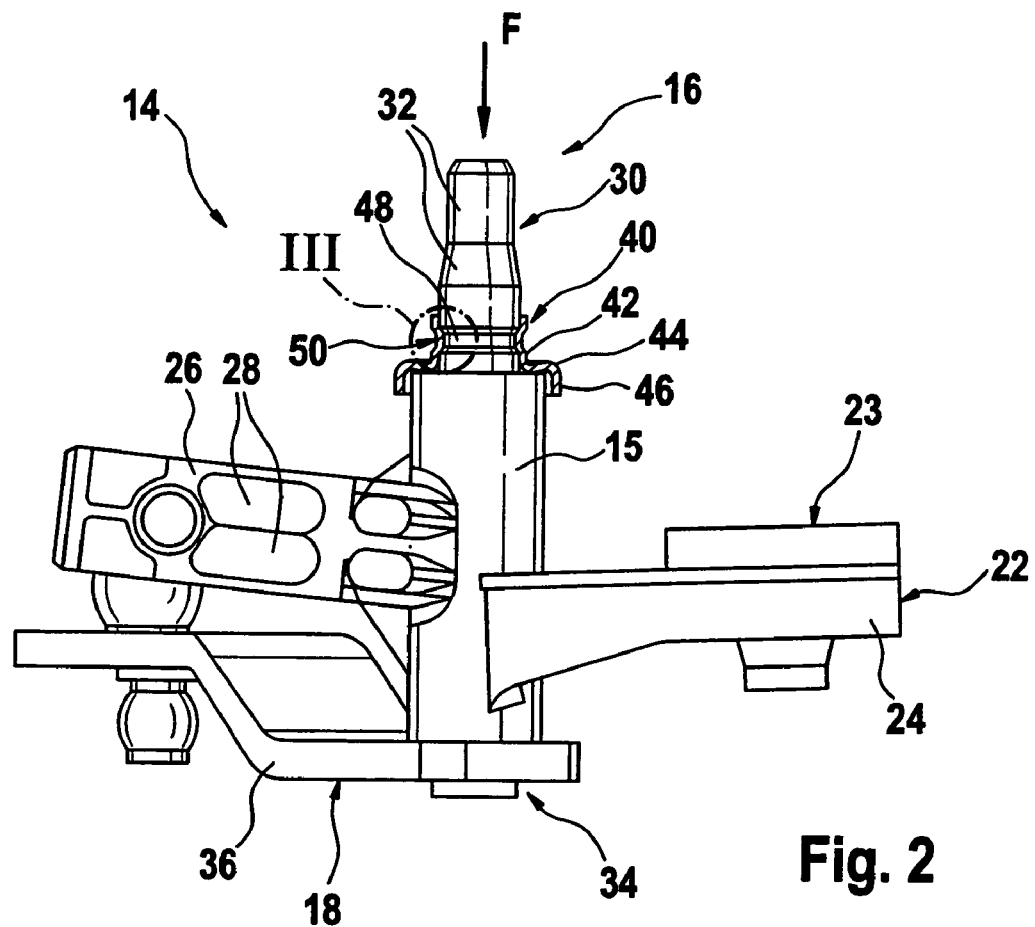
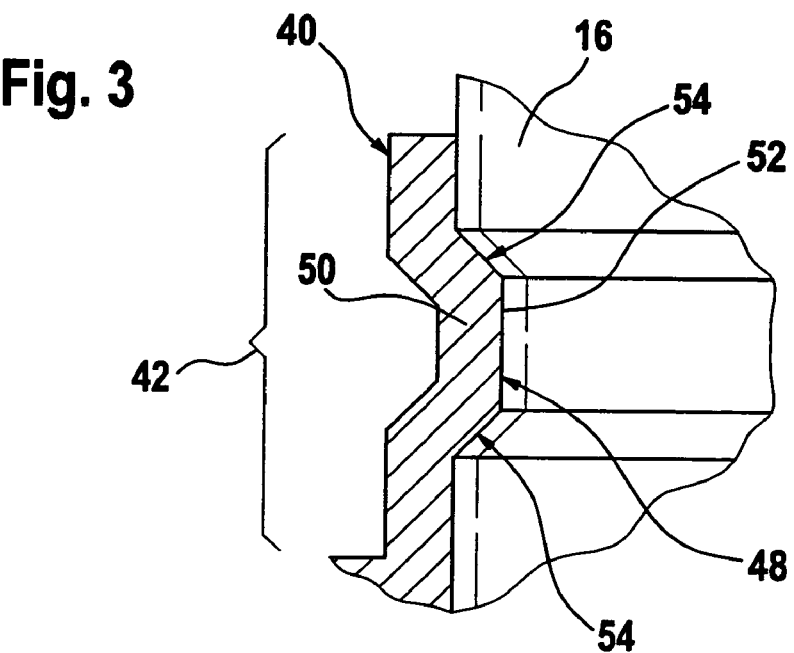

WINDSCREEN WIPING DEVICE, PARTICULARLY FOR A MOTOR VEHICLE

BACKGROUND OF THE INVENTION

The invention relates to a windshield wiper device, particularly for a motor vehicle.

Numerous windshield wiper devices for motor vehicles having a wiper bearing supporting a wiper shaft, which can be displaced in relation to the wiper bearing by the effects of an axial force component, are known.

For example, a windshield wiper device is known from DE-A-198 51 816 in which the wiper shaft has a radial undercut, in which a securing device sits for axially fixing the wiper shaft in the wiper bearing. This securing device can be displaced by the effects of a defined axial force component on the wiper shaft, whereby the wiper shaft can be displaced in relation to the wiper bearing. This type of axial force component can be caused for example by a pedestrian impacting the wiper shafts of the motor vehicle during an accident. In this case, the wiper shafts recede and disappear within the body of the vehicle thereby reducing the risk of injury to the pedestrian. However, the embodiment shown there is expensive and cost-intensive and therefore only suitable in a limited way for reasonably priced motor vehicles.

SUMMARY OF THE INVENTION

The advantage of the windshield wiper device in accordance with the invention is that it makes a simple realization of pedestrian impact protection possible, which is also cost-effective and allows precise adjustment of the axial force component required for the wiper shaft to recede. This is achieved by a securing device that has a bushing section with an indentation, which engages in the undercut of the wiper shaft.

It is particularly advantageous if the undercut is embodied to be radially circumferential. As a result, the undercut can be made in a simple manner when machining the wiper shaft and a further processing step in manufacturing the undercut is spared.

The axial force component can be adjusted especially precisely via a tub-shaped embodiment of the undercut.

If the indentation in the bushing section of the securing device is embodied to be radially circumferential, the securing device can also be manufactured in a very simple manner and placed on the wiper shaft without having to consider the radial position.

In this case, it is especially advantageous if the indentation is embodied to be tub-shaped in cross section in order to carry out a precise adjustment of the required axial force component.

Ideally, a flange section that is effectively connected to the wiper bearing is attached to the bushing section. As a result, the axial force component acting in the case of a pedestrian impact can be optimally transmitted to the securing device since a large surface of the securing device is supported on the wiper bearing.

The wiper bearing can be protected from dirt and moisture by a bushing-shaped closure section, which is attached to the flange section, making it possible to dispense with an additional closure element for the wiper bearing.

Especially simple and cost-effective manufacturing of the securing device can be achieved by a structure of the securing device that is essentially rotationally symmetrical and essentially S-shaped in cross section.

It is especially advantageous if the rotationally symmetrical securing device has a radial gap. The securing device can bend open via this gap so that even small required force components can be realized.

The securing device can be embodied simply and cost-effectively as a punched bent part made of sheet metal.

In addition, the embodiment of the securing device of fiber reinforced plastic is especially advantageous.

BRIEF DESCRIPTION OF THE DRAWINGS

One exemplary embodiment of the invention is depicted in the drawings and explained in greater detail in the following description.

The drawings show.

DETAILED DESCRIPTION

Figure 1:
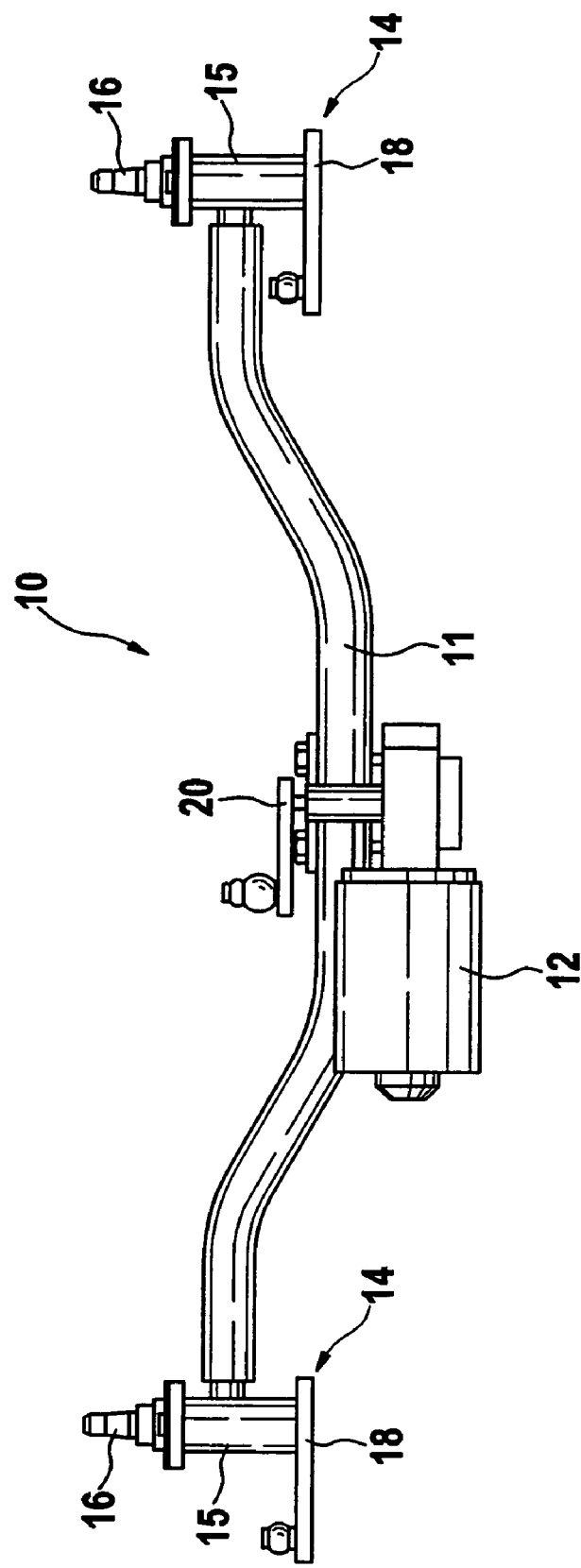
FIG. 1 A schematic depiction of a windshield wiper device in accordance with the invention FIG. 2 A partial sectional representation of a wiper bearing of a windshield wiper device in accordance with the invention FIG. 3 A detail of an undercut in the wiper shaft with the securing device

FIG. 1 shows a schematic representation of a windshield wiper device 10 in accordance with the invention. It is comprised essentially of a support tube 11 on which a wiper motor 12 is fastened. The support tube 11 has two ends on each of which a wiper bearing 14 is arranged.

The wiper bearing 14 is comprised essentially of a tubular section 15, which is penetrated by a wiper shaft 16. The wiper shaft 16 itself is connected in a rotationally secured manner at one end to a driving crank 18, which is connected via a thrust rod (not shown for the sake of clarity) to an output crank 20 being driven by the wiper motor 12.

In operation, the output crank 20 executes rotational or back-and-forth movement, whereby the driving crank 18 and therefore the wiper shaft 16 are put into a pendulum movement via the thrust rod.

FIG. 2 shows a partial sectional representation of the wiper bearing 14 with the wiper shaft 16. The wiper bearing 14 is comprised essentially of the tubular section 15, which is penetrated by the wiper shaft 16. A fastening section 22 is arranged on the tubular section 15, which is used to fasten the windshield wiper device 10 to the motor vehicle.

The fastening section 22 is essentially embodied as a flat plate, which is arranged essentially perpendicular to the axis formed by the wiper shaft. An opening 23 is provided in the plate of the fastening section 22, and this opening is used to accommodate fastening means such as screws or rivets for example. The fastening section 22 is also provided with a circumferential side wall 24 for reinforcing purposes, which extends in a collar-like manner starting from the edge of the flat plate.

Arranged on the side of the tubular section 15 facing radially away from the fastening section 22 is a fastening connecting piece 26, which has an essentially cylindrical form and extends to the outside approximately perpendicular to the axis formed by the wiper shaft 16. This fastening connecting piece 26 is used to fastening the wiper bearing 14 to the support tube 11 and features corresponding fastening elements 28 for this purpose so that the fastening connecting piece 26 can be crimped with the support tube 11. However, in a variation, the wiper bearing 14 can also be embodied as a one-part piece with the support tube 11.

The wiper shaft 16 has two ends 30, 34, which project from the tubular section of the wiper bearing 14. On the first free end 30, a cone and a thread are provided as holding elements 32, on which a wiper arm (not shown here for reasons of clarity) can be fastened. The driving crank 18 is connected to the other end 34 of the wiper shaft 16 in a rotationally secured manner. This driving crank is comprised essentially of a longish crank plate 36, which is connected on its one end to the wiper shaft 16 and bears a crank articulated bolt 38 on its other end, which is provided for connection to the thrust rod.

Sitting on the wiper shaft 16 is the securing device 40, which essentially has three sections 42, 44, 46, namely a bushing section 42, to which a flange section 44 is attached, via which the wiper shaft 16 is supported axially on the tubular section 15 of the wiper bearing 14. Attached in turn to this flange section 44 is a closure section 46. The wiper shaft 16 and the securing device 40 are shown here in cross section.

The wiper shaft 16 has an undercut 48 near the tubular section 15, which is embodied to be tub-shaped and radially circumferential. The securing device 40 correspondingly has an indentation 50 in its bushing section 42, which is positively engaged with the undercut 48.

The indentation 50 in the securing device 40 can already be provided during manufacturing and the securing device 40 can be slid with force on the wiper shaft 16 until the indentation 50 engages in the undercut 48. In one variation, it is also possible to slide the securing device 40 without the indentation 50 on the wiper shaft 16 and then press the indentation 50 into the undercut 48 with an external effect of force.

FIG. 3 shows a detail of the indentation 50 of the securing device 40 and the undercut 48 of the wiper shaft 16. The undercut 48 is embodied to be tub-shaped and as a result, has a base surface 52 and a side surface 54 inclined thereto by an angle of approximate 45°, and this side surface faces the free end 30 of the wiper shaft. An angle of 90° can also be provided on the side surface 54 facing away from the free end 30 since in the case of a pedestrian impact, the defined axial force component acts on the free end 30 so that the securing device 40 is pushed in the direction of the free end. Because of the inclination of the side surface 54 facing the free end 30, the securing device 40 then glides on a slanted plane in the direction of the free end 30. In a variation, the base surface 52, for example, can also be dispensed with and a V-shaped undercut 48 can be provided. In another variation, this undercut 48 can also have diagonal side surface 54 facing the free end 30, which side surface turns directly into the other side surface 54 facing away from the free end 30, whereby a slant is provided for the side surface facing the free end 30 and an angle of 90° is provided for the side surface that faces away.

In a further variation, the undercut 48 is not embodied to be circumferential, but as a recess, whereby the indentation 50 of the securing device 40, or more precisely of the bushing section 42 of the securing device 40, is correspondingly embodied. In this case, only a quasi-punctual instead of a circumferential indention 50 is provided.

Of course, these possibilities can also be combined. In this case, although the undercut 48 would be embodied to be circumferential, the indentation 50 of the securing device 40 would be arranged only punctually however.

The wiper bearing 14 is manufactured as one-part with the tubular section 15, the fastening section 22 and the fastening connecting piece 26 in a plastic injection molding process.

The securing device 40 is embodied as a simple punched bent part made of sheet metal. In one variation, this part can be manufactured, however, of plastic or fiber reinforced plastic or another material such as ceramic.

In operation, the flange section 44 is placed directly on the front side of the tubular section 15 facing the free end 30 of the wiper shaft 16. One or more stop disks can be provided between the flange section 44 and the tubular section 15.

The closure section 46 is formed to be bushing-like and grips over the end of the tubular section 15 of the wiper bearing 14 in a cover-like manner. Sealing elements can also be provided here in a supplementary manner to protect the wiper bearing 14 from penetrating water and dirt.

The invention claimed is:

1. Windshield wiper device (10) comprising at least one wiper bearing (14) having an end surface and an outer surface and supporting at least one wiper shaft (16), which has at least one undercut (48) in which a securing device (40) for axially fixing the wiper shaft (16) in the wiper bearing (14) is arranged, which securing device is displaced by the effects of a defined axial force component (F) on the wiper shaft (16), whereby the wiper shaft (16) is displaced in relationship to the wiper bearing (14), characterized in that the securing device (40) comprises a bushing section (42) supporting the wiper shaft (16) and with an indentation (50), which engages in the undercut (48) of the wiper shaft (16), a flange section (44) attached to the bushing section (42) and engaging the end surface of the wiper bearing (14), and a bushing-shaped closure section (46) attached to the flange section (44) and surrounding a portion of the outer surface of the wiper bearing (14).

2. Windshield wiper device (10) according to claim 1, characterized in that undercut (48) is embodied to be radially circumferential.

3. Windshield wiper device (10) according to claim 2, characterized in that undercut (48) is tub-shaped.

4. Windshield wiper device (10) according to claim 3, characterized in that the indentation (50) is embodied to be radially circumferential.

5. Windshield wiper device (10) according to claim 4, characterized in that indentation (50) is embodied to be tub-shaped in cross section.

6. Windshield wiper device (10) according to claim 5, characterized in that the securing device (40) is embodied essentially rotationally symmetrically and essentially S-shaped in cross section.

7. Windshield wiper device (10) according to claim 6, characterized in that the securing device (40) is embodied essentially rotationally symmetrically and has a radial gap.

8. Windshield wiper device (10) according to claim 7, characterized in that the securing device (40) is embodied at least partially as a punched bent part made of sheet metal.

9. Windshield wiper device (10) according to claim 7, characterized in that the securing device (40) is embodied at least partially of fiber reinforced plastic.

10. Windshield wiper device (10) according to claim 1, characterized in that the indentation (50) is embodied to be radially circumferential.

11. Windshield wiper device (10) according to claim 10, characterized in that indentation (50) is embodied to be tub-shaped in cross section.

12. Windshield wiper device (10) according to claim 1, characterized in that the securing device (40) is embodied essentially rotationally symmetrically and essentially S-shaped in cross section.

13. Windshield wiper device (10) according to claim 1, characterized in that the securing device (40) is embodied essentially rotationally symmetrically and has a radial gap.

14. Windshield wiper device (10) according to claim 1, characterized in that the securing device (40) is embodied at least partially as a punched bent part made of sheet metal.

15. Windshield wiper device (10) according to claim 1, characterized in that the securing device (40) is embodied at least partially of fiber reinforced plastic.

16. Windshield wiper device (10) according to claim 1, characterized in that the bushing section (42) has a wall with an inner surface and an outer surface, the indentation being provided on the inner surface and a corresponding recess being provided on the outer surface.

17. Windshield wiper device (10) according to claim 1, characterized in that the bushing section (42) has a wall with an inner surface and an outer surface, the wall having a first cylindrical portion on one axial side of the indentation and a second cylindrical portion on an opposite axial side of the indentation, the wall being bent between the cylindrical portions to provide the indentation on the inner surface and a corresponding recess on the outer surface.

18. Windshield wiper device (10) comprising at least one wiper bearing (14) having an end surface and an outer surface and supporting at least one wiper shaft (16), which has at least one undercut (48) in which a securing device (40) for axially fixing the wiper shaft (16) in the wiper bearing (14) is arranged, which securing device is displaced by the effects of a defined axial force component (F) on the wiper shaft (16), whereby the wiper shaft (16) is displaced in relationship to the wiper bearing (14), characterized in that the securing device (40) comprises a bushing section (42) supporting the wiper shaft (16) and with an indentation (50), which engages in the undercut (48) of the wiper shaft (16), the bushing section having a wall with an inner surface and an outer surface, the wall having a first cylindrical portion on one axial side of the indentation and a second cylindrical portion on an opposite axial side of the indentation, the wall being bent between the cylindrical portions to provide the indentation on the inner surface and a corresponding recess on the outer surface, the securing device also comprising a flange section (44) attached to the second cylindrical portion of the bushing section (42) and engaging the end surface of the wiper bearing (14), and a bushing-shaped closure section (46) attached to the flange section (44) and surrounding a portion of the outer surface of the wiper bearing (14).

19. A method of installing a windshield wiper device (10), the windshield wiper device including at least one wiper bearing (14) having an end surface and an outer surface and supporting at least one wiper shaft (16), which has at least one undercut (48) in which a securing device (40) for axially fixing the wiper shaft in the wiper bearing is arranged, which securing device is displaced by the effects of a defined axial force component (F) on the wiper shaft, whereby the wiper shaft is displaced in relationship to the wiper bearing, the securing device (40) comprising a bushing section (42) having a wall with an inner surface and an outer surface, a flange section (44) attached to the bushing section, and a bushing-shaped closure section (46) attached to the flange section, the method comprising positioning the securing device with the bushing section supporting the wiper shaft, the flange section engaging the end surface of the wiper bearing, and the closure section surrounding a portion of the outer surface of the wiper bearing, and pressing the bushing section with an external force to form an indentation (50), which engages in the undercut of the wiper shaft.

20. The method according to claim 19, characterized in that the wall has a first cylindrical portion on one axial side of the indentation and a second cylindrical portion on an opposite axial side of the indentation, and in that pressing includes bending the wall between the cylindrical portions to provide the indentation on the inner surface and a corresponding recess on the outer surface.

* * * * *